United States Patent [19]

Rich

[11] 3,868,352

[45] Feb. 25, 1975

[54] PROCESS FOR THE CONTINUOUS POLYMERISATION OF POLYAMIDES

[75] Inventor: John Theodore Rich, Pontypool, England

[73] Assignee: Imperial Chemical Industries Limited, London, England

[22] Filed: Aug. 24, 1973

[21] Appl. No.: 391,259

[30] Foreign Application Priority Data
Sept. 7, 1972 Great Britain.................... 41488/72

[52] U.S. Cl................ 260/78 R, 23/284, 23/252 A, 23/252 R, 23/290, 260/78 S
[51] Int. Cl. ........................ C08G 20/00, C08f 1/98

[58] Field of Search...... 23/284, 285, 252 A, 252 R, 23/290; 260/78 R, 78 S

[56] References Cited
UNITED STATES PATENTS

| | | | |
|---|---|---|---|
| 2,644,820 | 7/1953 | Gresham...................... | 23/252 A X |
| 2,689,839 | 9/1954 | Heckert ........................ | 260/78 R X |
| 3,278,494 | 10/1966 | Lodge ............................. | 260/78 R |

*Primary Examiner*—James H. Tayman, Jr.
*Attorney, Agent, or Firm*—Cushman, Darby & Cushman

[57] ABSTRACT

Process utilizing a tubular apparatus of defined dimensions for the continuous polymerisation of polyamides, the apparatus being constructed of metallic titanium.

2 Claims, No Drawings

PROCESS FOR THE CONTINUOUS POLYMERISATION OF POLYAMIDES

The present invention relates to an apparatus for the continuous manufacture of high molecular weight linear polyamides by condensation polymerisation.

In British Patent Specification No. 1,085,816 there is described an apparatus for the continuous manufacture of high molecular weight, linear, fibre-forming polyamide by condensation polymerisation of an aqueous mixture of monomers, the mixture being passed through an elongate reaction zone of defined dimensions under conditions of elevated temperature and superatmospheric pressure. To date, such apparatus has been constructed of stainless steel or Incoloy (Registered Trade Mark). It has been found that textile materials derived from polyamides which have been manufactured in such stainless steel apparatus are prone to oxidation on being dry heat set. Oxidation manifests itself as a decrease in the viscosity ratio of the polyamide and a decrease in the concentration of amine end groups in the polyamide.

We have now found that, if such apparatus is constructed of metallic titanium, the resultant polyamide possesses a higher resistance to oxidation, for example, during dry heat setting. We have also found that, under comparable polymerisation conditions, polyamide manufactured in a titanium apparatus has a higher viscosity ratio compared with polyamide manufactured in a stainless steel apparatus. Further, in the continuous manufacture of poly(hexamethylene adipamide) from hexamethylene adipamide salt in the presence of an excess of hexamethylene diamine, the loss of hexamethylene diamine during passage through a titanium apparatus is reduced compared with a stainless steel apparatus.

Accordingly, we provide an apparatus for the continuous manufacture of high molecular weight linear polyamides by condensation polymerisation, said apparatus constituting an elongate reaction zone defined by the following conditions;

I d increases gradually and/or in one or more stages, but never decreases, as v increases.
II V has a value from 1600Q to 10000Q,
III $\log d_{max} = 1.00 + 0.143 \tan^{-1}[(0.1 \text{ v/Q})-40] + 0.36 \log Q$.
IV $\log d_{min} = 0.67 + 0.250 \tan^{-1}[(0.002 \text{ v/Q})-2] + 0.36 \log Q$.

Q = rate of output of polyamide (throughput) in kilograms per hour
V = total volume of the reaction zone in cubic centimetres
v = volume of the reaction zone from its inlet end up to a given point along its length in cubic centimetres.
d = diameter of reaction zone at any given point along its length in millimetres
$d_{max}$ = maximum diameter of reaction zone at any given point along its length in millimeters
$d_{min}$ = the minimum value of the above diameter characterised in that at least the inner surface of said apparatus comprises metallic titanium.

By elongate reaction zones are meant reaction zones which are notably long in comparison to their width or diameter. The present elongate reaction zones may possess a circular or non-circular cross-section, provided that in the latter case the largest axis or diameter does not exceed four times the smallest axis or diameter. Accordingly whenever the diameter, i.e. the diameter of the cross-section, of the elongate reaction zone at any point along its length is referred to, the term "diameter" is to be understood, in the case of elongate reaction zones of non-circular cross-section, as referring to the diameter of a circle which would have the same area as the non-circular cross-section in question.

The elongate reaction zone, conveniently contained by a tube, may possess any convenient shape, e.g. a helix positioned vertically or horizontally. The vertical helix can be traversed by the polymerising mass in an upward or downward direction. The tube must be capable of withstanding a high pressure which may, for example reach 28 atmospheres at the inlet end.

Naturally the size or volume of the tube or reaction zone required depends on the desired rate of output. Moreover the diameter of the elongate reaction zone increases along its length gradually and/or in one or more stages from the inlet end of the zone to the outlet end thereof, but never decreases. The shape of the elongate reaction zone can be envisaged as defined by the diameters thereof all the way along its length. Two relationships have been elucidated regarding these diameters. Firstly it has been found that the diameter at any given point in the reaction zone is related to the throughput or rate of output of polymer. Secondly there is a relationship between the diameter of the elongate reaction zone at any given point along its length and the volume of the reaction zone from the inlet end thereof up to that point. These relationships can be ascribed to the nature of the polymerisation process including the changes in pressure, viscosity of reagents etc. associated therewith and also the mode or pattern of flow of the materials in the reaction zone or tube. In fact the said materials constitute a two-phase system inasmuch as they comprise steam and molten (unfinished) polyamide. The pattern of flow in the present system is an annular pattern, wherein the molten polyamide streams along the tube in the form of a molten layer on the internal surface thereof while the steam rushes along the centre of the tube. The above relationships have been quantified and the derivation of the definition of the elongate reaction is described in British Patent Specification No. 1,085,816.

In the above descriptions and hereinafter the reaction zone is defined as that area wherein reaction e.g. polymerisation occurs.

It will be evident that V/Q denotes the total volume of the reaction zone per unit of output and v/Q designates the volume of the reaction zone from its inlet end up to a given point per unit of throughput.

It has been found that for the polymerisation process to run successfully the total volume V of the reaction zone has a value falling within the range of from 1600Q to 10000Q, more preferably about 1600Q to 4400Q and most preferably about 2000Q to 3600Q. In other words successful reaction zones have a total volume of from 1600 to 10000 cc per kgm per hour of output.

Examples of suitable monomers which may be polymerised in the present apparatus are those listed in British Patent Specification No. 1,085,816.

For making a given polyamide it is found in practice that a temperature at least 10°C above the melting point of the polyamide can be regarded as a suitable polymerisation temperature i.e. a temperature at which amide formation proceeds at a useful rate, provided it be not too high otherwise degradation of the polyamide is likely to occur. The temperature of the polymerising material is preferably not allowed to fall as it passes through the elongate reaction zone. It is convenient that the whole zone be at one uniform temperature. The temperature is advantageously from 275°C to 300°C.

The mixture of monomer and water should constitute a strong solution or suspension anad contains preferably at least 40% by weight of monomer. Furthermore suspensions of monomer are desirably heated so as to bring about solution; in any case sufficient water should be present to dissolve the monomer at polymerisation temperature.

The polyamides manufactured in the present apparatus may be melt-spun into filaments, films, ribbons and like lengthy extruded objects.

The following examples illustrate but do not limit the present invention.

EXAMPLE 1

This example illustrates the improved resistance to oxidation of polyamide manufactured in a titanium apparatus compared with polyamide manufactured in a stainless steel apparatus.

Poly(hexamethylene adipamide) was manufactured in a titanium tubular apparatus comprising in sequence 183 feet of 0.24 inch internal diameter, 50 feet of 0.404 inch internal diameter, 28 feet of 0.654 inch internal diameter and 50 feet of 0.872 inch internal diameter. A 48% aqueous solution of hexamethylene adipamide salt was pumped into the tubular apparatus at approximately 280 p.s.i. and at approximately 112 g/min. The polymerisation and spinning temperatures were 290°C. Excess hexamethylene diamine was added as a 4% aqueous solution at a rate of 10 mls/min. The rate of output of polyamide was 3 kg/hour.

A 220 decitex 20 filament yarn was spun from the polymer at 1127 m.p.m. The undrawn yarn was oxidised by heating at 220°C for 30 seconds in air. The colour of the yarn was measured as 'b' chromaticity on a Colormaster instrument.

For comparison, a 220 decitex 20 filament yarn was spun from poly(hexamethylene adipamide) manufactured in a stainless steel apparatus of similar dimensions. The following results were obtained:

|  | Before oxidation | | | After oxidation | | | % VR loss | % AEG loss | Loss in 'b' |
| --- | --- | --- | --- | --- | --- | --- | --- | --- | --- |
|  | VR | AEG equivs/ $10^6$ g | 'b' chromaticity | VR | AEG equivs/ $10^6$ g | 'b' chromaticity |  |  |  |
| Polyamide made in stainless steel apparatus. | 43.4 | 67.5 | 0.3230 | 23.1 | 36.0 | 0.2471 | 47 | 47 | 0.0759 |
| Polyamide made in titanium apparatus. | 44.9 | 68.5 | 0.3292 | 37.0 | 51.9 | 0.2643 | 17.6 | 25.7 | 0.0649 |

In the above table, VR is the viscosity ratio of the polyamide measured on an 8.4% weight to volume solution in 90% formic acid at 25°C and AEG is the amine end group concentration in the polyamide.

EXAMPLE 2

This example illustrates that, under comparable polymerisation conditions, polyamide manufactured in a titanium apparatus has a higher viscosity ratio than polyamide manufactured in a stainless steel apparatus.

Poly(hexamethylene adipamide) was manufactured in a titanium tubular apparatus of construction as described in Example 1. The polymerisation conditions were the same as in Example 1 except that no excess hexamethylene diamine was added.

The resultant polyamide had a viscosity ratio, measured as in Example 1, of 44.4; an amine end group concentration of 41.0 equivalents/$10^6$ g and a carboxyl end group concentration of 76.6 equivalents/$10^6$ g.

Poly(hexamethylene adipamide), manufactured under comparable polymerisation conditions except that the tubular apparatus was constructed of stainless steel, had a viscosity ratio of only 39.9. The amine and carboxyl end group concentrations were 40.0 and 87.1 equivalents/$10^6$ g respectively.

EXAMPLE 3

This example illustrates that in the continuous manufacture of poly(hexamethylene adipamide) having a given amine end group concentration from hexamethylene adipamide salt and hexamethylene diamine, less hexamethylene diamine is required to be added when the manufacture is in a titanium apparatus compared with a stainless steel apparatus, i.e. the loss of hexamethylene diamine by steam distillation into the central vapour phase is less in a titanium tubular apparatus than in a stainless steel tubular apparatus.

Poly(hexamethylene adipamide) was manufactured in a titanium tubular apparatus of construction as described in Example 1. The polymerisation conditions were the same as in Example 1 except that excess hexamethylene adipamide was added as a 4% aqueous solution at a rate of 4.8 mls/min.

The resultant polyamide had an amine end group concentration of 54.9 equivalents/$10^6$ g, and a viscosity ratio, measured as in Example 1, of 48.0.

In order to produce poly(hexamethylene adipamide) having an amine end group concentration of 56.3 equivalents/$10^6$ g from a stainless steel tubular apparatus of similar dimensions, it was necessary to add 6.3 ml/min of excess hexamethylene diamine.

What I claim is:

1. A continuous process for the manufacture of high molecular weight linear polyamides by condensation polymerisation comprising passing an aqueous solution of a polyamide-forming monomer under conditions of elevated temperature and super-atmospheric pressure through elongate reaction zone defined by the following conditions;

I $d$ increases gradually and/or in one or more stages, but never decreases, as v increases.

II V has a value from 1600Q to 10000Q,

III $\log d_{max} = 1.00 + 0.143 \tan^{-1}[(0.1\, v/Q) - 40] + 0.36 \log Q$.

IV $\log d_{min} = 0.67 + 0.250 \tan^{-1}[(0.002 \text{ v/Q}) - 2] + 0.36 \log Q$.

Q = rate of output of polyamide (throughput) in kilograms per hour

V = total volume of the reaction zone in cubic centimetres v = volume of the reaction zone from its inlet end up to a given point along its length in cubic centimetres.

d = diameter of reaction zone at any given point along its length in millimetres $d_{max}$ = maximum diameter of reaction zone at any given point along its length in millimetres $d_{min}$ = the minimum value of the above diameter, at least the inner surface of said elongate reaction zone comprising metallic titanium.

2. High molecular weight polyamide produced by the process of claim 1.

* * * * *